United States Patent [19]

Ryan

[11] Patent Number: 4,529,484
[45] Date of Patent: Jul. 16, 1985

[54] FRACTIONAL DISTILLATION COLUMN CONTROL

[75] Inventor: Lawrence A. Ryan, Bartlesville, Okla.

[73] Assignee: Phillips Petroleum Company, Bartlesville, Okla.

[21] Appl. No.: 430,633

[22] Filed: Sep. 30, 1982

Related U.S. Application Data

[62] Division of Ser. No. 344,146, Jan. 29, 1982, Pat. No. 4,417,311.

[51] Int. Cl.³ ............................................. B01D 3/42
[52] U.S. Cl. ......................................... 203/2; 62/21; 203/DIG. 18; 208/DIG. 1
[58] Field of Search ................. 208/DIG. 1; 203/1, 2, 203/3, DIG. 18; 202/160; 196/132; 62/21, 37; 364/501

[56] References Cited

U.S. PATENT DOCUMENTS

4,289,588  9/1981  Hofferber ................... 203/DIG. 18

Primary Examiner—Frank Sever

[57] ABSTRACT

A desired cloud point temperature for a side draw product stream from a fractional distillation column is maintained at a desired level by comparing a calculated actual cloud point temperature, which is updated periodically by a cloud point measurement, to a desired cloud point temperature with results of the comparison being utilized to control the flow rate of the side draw product stream so as to maintain the actual cloud point temperature of the side draw product stream substantially equal to the desired cloud point temperature. Use of the calculated cloud point temperature provides a means by which continuous control of the actual cloud point temperature of the side draw product stream can be maintained.

5 Claims, 8 Drawing Figures

FRACTIONAL DISTILLATION COLUMN CONTROL

This application is a division of application Ser. No. 344,146, filed Jan. 29, 1982, now U.S. Pat. No. 4,417,311.

This invention relates to control of a fractional distillation column. In one aspect this invention relates to method and apparatus for continuously controlling the cloud point temperature for a product stream drawn from the side of a fractional distillation column ("side draw product").

As used herein the term "end point temperature" refers to a temperature at which all of a liquid has boiled off. The term "cut point temperature" refers to a temperature at which some percentage of a liquid has boiled off. The term "cloud point temperature" refers to a temperature at which a fractional distillation product becomes cloudy or opaque which generally indicates that wax or other substances are beginning to crystallize or separate from the fractional distillation product. The term "internal reflux to vapor ratio" refers preferably to a mass flow rate ratio but a volume flow rate ratio may be utilized if desired since either of these ratios may be derived from a knowledge of the other ratio.

The cold flow properties of products from a crude oil distillation tower are important especially when these products are used in geographical localities having cold ambient temperatures. This is especially true of the heavier products such as the heavy gas oil. One cold flow property typically specified is the cloud point temperature.

In the past, control of a cloud point temperature for a particular product stream has generally been implemented by utilizing an analysis of the product stream to determine the actual cloud point of that particular product stream. Control of the cloud point temperature is then based on such analysis. However, the interval between tower changes and cloud point measurements is generally on the order of about an hour and it is very difficult to maintain continuous control of cloud point based on such intermittent measurements.

It is thus an object of this invention to provide method and apparatus for continuously controlling the cloud point temperature for a side draw product stream withdrawn from a fractional distillation column.

In accordance with the present invention, method and apparatus is provided whereby a calculated actual cloud point temperature, which is updated periodically by a cloud point measurement, is compared to a desired cloud point temperature with the results of the comparison being utilized to control the flow rate of the side draw product stream so as to maintain the actual cloud point of the side draw stream substantially equal to the desired cloud point. In general, the actual cloud point may be determined by determining the actual internal reflux to vapor ratio based on a basic material balance and heat balance around the specific area of the column which is of concern for the particular side draw product stream. The thus determined actual internal reflux to vapor ratio is then utilized to determine the actual end point or cut point of the particular sidedraw product stream and this end point or cut point is utilized to determine the actual cloud point of the sidedraw product stream. The thus calculated cloud point is corrected periodically by comparing the calculated cloud point to the periodically provided actual cloud point measurement to derive a correction factor which is applied to the calculated cloud point during the period between actual cloud point measurements. In this manner, an actual cloud point is available continuously which enables continuous control of the actual cloud point of the sidedraw product stream.

Other objects and advantages of the invention will be apparent from the foregoing brief description of the invention and the claims as well as the detailed description of the drawings in which:

The invention is illustrated and described in terms of a crude tower for fractionating a crude oil feed. However, the invention is also applicable to other types of fractional distillation columns in which it is desired to control the cloud point temperature of a product stream flowing from the fractional distillation column. Also, the invention is described in terms of the control of the cloud point of one product stream but is applicable to the control of the cloud point of combined product streams.

Figure 1:
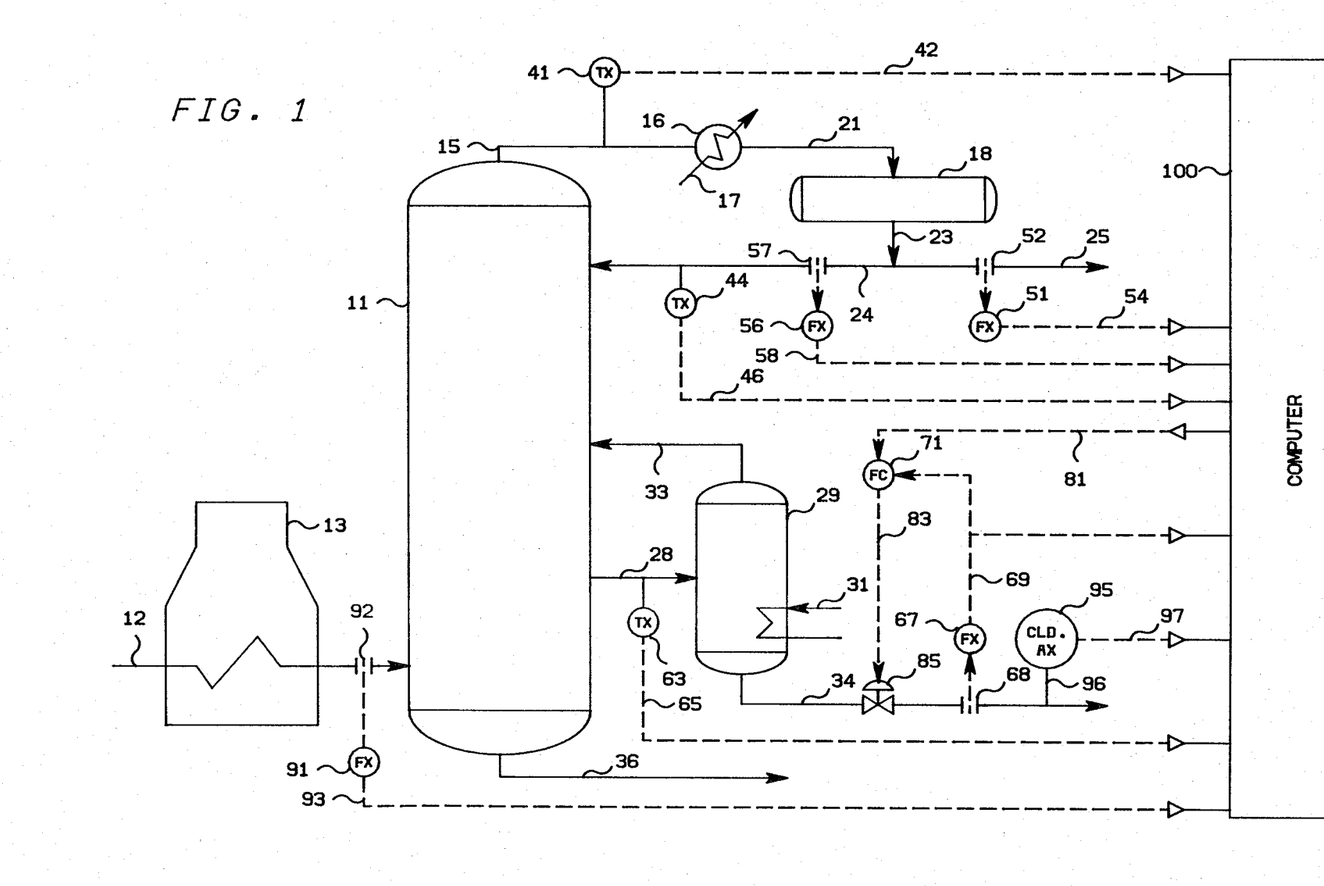
FIG. 1 is an illustration of a fractional distillation column and the associated control system for maintaining a desired cloud point temperature for a side draw product stream withdrawn from the fractional distillation column.

A specific control system configuration is set forth in FIG. 1 for the sake of illustration. However, the invention extends to different types of control system configurations which accomplish the purpose of the invention. Lines designated as signal lines in the drawings are electrical or pneumatic in this preferred embodiment. Generally, the signals provided from any transducer are electrical in form. However, the signals provided from flow sensors will generally be pneumatic in form. Transducing of these signals is not illustrated for the sake of simplicity because it is well known in the art that if a flow is measured in pneumatic form it must be transduced to electrical form if it is to be transmitted in electrical form by a flow transducer. Also, transducing of the signals from analog form to digital form or from digital form to analog form is not illustrated because such transducing is also well known in the art.

The invention is also applicable to mechanical, hydraulic or other signal means for transmitting information. In almost all control systems some combination of electrical, pneumatic, mechanical or hydraulic signals will be used. However, use of any other type of signal transmission, compatible with the process and equipment in use, is within the scope of the invention.

A digital computer is used in the preferred embodiment of this invention to calculate the required control signal based on measured process parameters as well as set points supplied to the computer. Analog computers or other types of computing devices could also be used in the invention. The digital computer is preferably an OPTROL 7000 Process Computer System from Applied Automation, Inc., Bartlesville, Okla.

Signal lines are also utilized to represent the results of calculations carried out in a digital computer and the term "signal" is utilized to refer to such results. Thus, the term signal is used not only to refer to electrical currents or pneumatic pressures but is also used to refer to binary representations of a calculated or measured value.

The controllers shown may utilize the various modes of control such as proportional, proportional-integral, proportional-derivative, or proportional-integral-derivative. In this preferred embodiment, proportional-integral-derivative controllers are utilized but any controller capable of accepting two input signals and producing a scaled output signal, representative of a comparison of the two input signals, is within the scope of the invention.

The scaling of an output signal by a controller is well known in control system art. Essentially, the output of a controller may be scaled to represent any desired factor or variable. An example of this is where a desired flow rate and an actual flow rate is compared by a controller. The output could be a signal representative of a desired change in the flow rate of some gas necessary to make the desired and actual flows equal. On the other hand, the same output signal could be scaled to represent a percentage or could be scaled to represent a temperature change required to make the desired and actual flows equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented using electrical analog, digital electronic, pneumatic, hydraulic, mechanical or other similar types of equipment or combinations of one or more such equipment types. While the presently preferred embodiment of the invention preferably utilizes a combination of pneumatic final control elements in conjunction with electrical analog signal handling and translation apparatus, the apparatus and method of the invention can be implemented using a variety of specific equipment available to and understood by those skilled in the process control art. Likewise, the format of the various signals can be modified substantially in order to accommodate signal format requirements of the particular installation, safety factors, the physical characteristics of the measuring or control instruments and other similar factors. For example, a raw flow measurment signal produced by a differential pressure orifice flow meter would ordinarily exhibit a generally proportional relationship to the square of the actual flow rate. Other measuring instruments might produce a signal which is proportional to the measured parameter, and still other transducing means may produce a signal which bears a more complicated, but known, relationship to the measured parameter. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Referring now to the drawings, and in particular to FIG. 1, there is illustrated a fractional distillation column 11 which is utilized to fractionate a crude oil feed into a variety of products. For the sake of simplicity, only the overhead product, bottoms product and one side draw product are illustrated in FIG. 1. The crude oil feed is supplied to the fractional distillation column 11 through the combination of conduit means 12 and furnace 13. The crude oil feed is heated to a desired temperature in the furnace 13 prior to entering the fractional distillation column 11.

An overhead stream is provided from the fractional distillation column 11 through conduit means 15 to the heat exchanger 16. The heat exchanger 16 is provided with a cooling medium flowing through conduit means 17. The fluid stream from the heat exchanger 16 is provided to the overhead accumulator through conduit means 21. Liquid in the accumulator is withdrawn from the accumulator through conduit means 23. The fluid flowing through conduit means 23 is provided as an upper external reflux to the fractional distillation column 11 through the combination of conduit means 23 and conduit means 24. The fluid flowing through conduit means 23 is also provided as the overhead product from the fractional distillation column 11 by the combination of conduit means 23 and 25.

A side draw stream is withdrawn from the fractional distillation column 11 through conduit means 28. The side draw stream flowing through conduit means 28 may be considered representative of any side draw stream that may be withdrawn from a crude tower such as the heavy naphtha side draw stream, light gas oil side draw stream, kerosene side draw stream or heavy gas oil side draw stream. Since all side draw streams are treated in the same manner for control purposes, only one side draw stream is illustrated for the sake of clarity.

The side draw stream flowing through conduit means 28 is provided to the separator 29. A heating fluid flows to the separator 29 through conduit means 31. The separator 29 is utilized to separate some of the lighter components from the side draw stream 28. The separated lighter components are returned to the fractional distillation column 11 through conduit means 33. A side draw product stream is withdrawn from the separator 29 through conduit means 34.

A bottoms stream generally containing reduced crude oil is withdrawn from the fractional distillation column 11 through conduit means 36. A number of other process streams would generally be flowing to or being withdrawn from the fractional distillation column. However, for the sake of simplicity, these remaining process streams have not been illustrated since they play no part in the invention and also, the many pumps, additional heat exchangers, additional control components and other typical fractional distillation column equipment have not been illustrated.

Temperature transducer 41 in combination with a temperature measuring device such as a thermocouple, which is operably located in conduit means 15, provides an output signal 42 which is representative of the temperature of the overhead stream flowing through conduit means 15. Signal 42 is provided from the temperature transducer 41 as an input to computer means 100.

Temperature transducer 44 in combination with a temperature measuring device such as a thermocouple, which is operably located in conduit means 24, provides an output signal 46 which is representative of the temperature of the upper external reflux flowing through conduit means 24. Signal 46 is provided from the temperature transducer 44 as an input to computer means 100.

Flow transducer 51 in combination with the flow sensor 52, which is operably located in conduit means 25, provides an output signal 54 which is representative of the flow rate of the overhead product stream flowing through conduit means 25. Signal 54 is provided from the flow transducer 51 as an input to computer means 100.

Flow transducer 56 in combination with the flow sensor 57, which is operably located in conduit means 24, provides an output signal 58 which is representative of the flow rate of the upper external reflux flowing through conduit means 24. Signal 58 is provided from the flow transducer 56 as an input to computer means 100.

Temperature transducer 63 in combination with a temperature measuring device such as a thermocouple, which is operably located in conduit means 28, provides an output signal 65 which is representative of the temperature of the side draw stream flowing through conduit means 28. Signal 65 is provided from the temperature transducer 63 as an input to computer means 100.

Flow transducer 67 in combination with a flow sensor 68, which is operably located in conduit means 34, provides an output signal 69 which is representative of the flow rate of the side draw product stream flowing through conduit means 34. Signal 69 is provided from the flow transducer 67 as an input to computer means 100 and as an input to the flow controller 71.

Flow transducer 91 in combination with the flow sensor 92, which is operably located in conduit means 12, provides an output signal 93 which is representative of the flow rate of the crude oil feed flowing through conduit means 12. Signal 93 is provided from the flow transducer 91 as an input to computer means 100.

Cloud point analyzer 95 is in fluid communication with conduit means 34 through conduit means 96. The cloud point analyzer may be a Cloud Point Monitor from Hone Instruments, Ltd., London, England. The cloud point analyzer 95 povides an output signal 97 which is representative of the actual cloud point of the side draw product stream flowing through conduit means 34. Signal 97 is provided from the cloud pont analyzer 95 as an input to computer means 100. Typically, a period of about an hour will elapse between the time a sample is taken by the cloud point analyzer 95 and the time an analysis of the sample is available.

In response to the described input signals, computer means 100 calculates the flow rate of the side draw product stream flowing through conduit means 34 required to maintain a desired cloud point temperature for the side draw product stream flowing through conduit means 34. Signal 81, which is representative of the flow rate of the side draw product stream flowing through conduit means 34 required to maintain a desired cloud point temperature for the side draw product stream flowing through conduit means 34, is provided from computer means 100 as the set point input to the flow controller 71. The flow controller 71 provides an output signal 83 which is responsive to the difference between signals 69 and 81. Signal 83 is provided to the control valve 85 which is operably located in conduit means 34. The control valve 85 is manipulated in response to signal 83 to thereby maintain the actual cloud point temperature substantially equal to the desired cloud point temperature.

Figure 2:
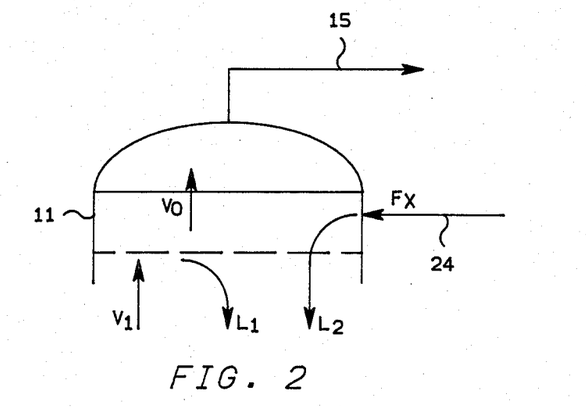
FIG. 2 is a diagrammatic illustration of the various flows of vapor and liquid at the top of the fractional distillation column illustrated in FIG. 1.
Figure 3:
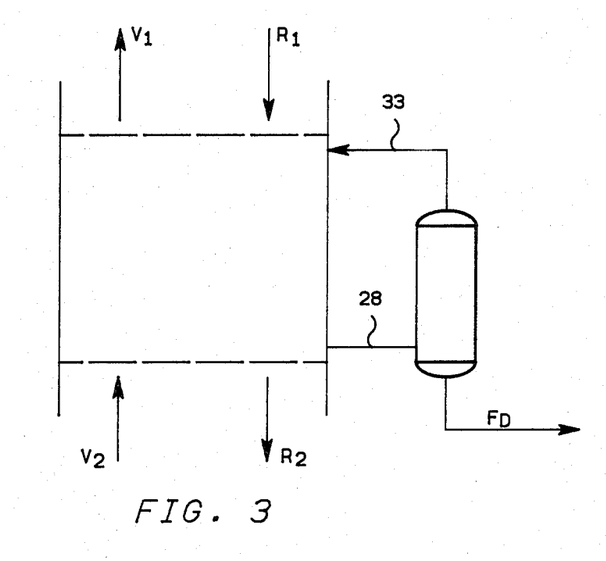
FIG. 3 is a diagrammatic illustration of the various flows of liquid and vapor in the central portion of the fractional distillation column illustrated in FIG. 1.

FIGS. 2 and 3 will be utilized to illustrate the manner in which the actual internal reflux to vapor ratio in the intermediate portion of the fractional distillation column 11 is calculated. All flow rates discussed are mass flow rates. Conversion of a measured volumetric flow rate to a mass flow rate is well known. In general, the measured volume flow rate of a fluid is multiplied by the density of the fluid to give the mass flow rate of the fluid. The density of the various fluids associated with any particular fractional distillation process will generally be well known but may be calculated from measured data if desired. Since this particular conversion is well known, the actual conversion is not described for each fluid stream hereinafter.

Referring now to FIG. 2, the dashed line is preferably the top tray of the fractional distillation column 11. A vapor illustrated as $V_1$ flows up the fractional distillation column. A portion of the vapor flowing up the fractional distillation column 11 is cooled when contacted with the upper external reflux flowing through conduit means 24 and is condensed. The portion of the vapor stream flowing up the fractional distillation column 11 that condenses is illustrated as $L_1$. The upper external reflux flowing down the fractional distillation column is illustrated as $L_2$. The combination of $L_1$ and $L_2$ is equal to the internal reflux flow rate immediately below the top tray of the fractional distillation column 11. The portion of the vapor flowing up the fractional distillation column which is not condensed is illustrated as $V_0$. This vapor flows through conduit means 15. A material balance for the upper portion of the fractional distillation column 11 illustrated in FIG. 1 gives $$V_1 - V_o = L_1 + L_2 - F_x. \qquad (1)$$

Rearranging Equation (1) and setting $L_1 + L_2$ equal to $R_1$, where $R_1$ is representative of the internal reflux flow rate in the upper portion of the fractional distillation column 11, gives $$V_1 = V_o + R_1 - F_x. \qquad (2)$$

A heat balance for the upper portion of the fractional distillation column 11 illustrated in FIG. 2 gives $$R_1 = F_x(1 + K\Delta T) \qquad (3)$$

where $\Delta T$ is the difference between the temperature of the vapor flowing through conduit means 15 and the temperature of the external reflux flowing through conduit means 24 and K is equal to the specific heat of the external reflux divided by the heat of vaporization for the external reflux. Using the nomenclature of FIG. 1, ΔT is equal to the difference between the temperature represented by signal 42 and a temperature represented by signal 46. $F_x$ is equal to the flow rate represented by signal 58 converted to a mass flow rate.

Calculation of the specific heat and heat of vaporization of a fluid such as the external reflux flowing through conduit means 24 is well known in the art. Reference materials such as *The Chemical Engineer's Handbook,* 4th and 5th edition, McGraw-Hill, provide calculations and tables for the specific heat and heat of vaporization of the components which would make up the external reflux flowing through conduit means 24.

Since $F_x$, K and ΔT are known in Equation (3), Equation (3) can be solved to derive the actual internal reflux in the upper portion of the fractional distillation column 11. $R_1$ can then be substituted into Equation (2) and since $V_o$ can be determined from the combination of the flow rate of the upper external reflux flowing through conduit means 24 and the overhead product flowing through conduit means 25, Equation (2) can be solved for the actual mass flow rate of the vapor at the top tray of the fractional distillation column 11.

Referring now to FIG. 3, the boundaries for the material and heat balance are chosen so as to be able to ignore the effect of the reflux returning through conduit means 33 except to the extent that that reflux affects $V_2$ or $R_2$ illustrated in FIG. 3. $V_1$ and $R_1$ are as previously described with reference to FIG. 2. $V_2$ is the vapor flow rate at a point immediately below the point from which the side draw stream flowing through conduit means 28 is withdrawn and in like manner $R_2$ is the liquid flow rate at that same point. A mass balance for FIG. 3 gives $$V_2 = F_D + V_1 + R_2 - R_1 \quad (4)$$

An energy balance for FIG. 3 gives $$R_2 = \frac{h_1}{(h_1 - C_p \Delta T)} R_1 - F_D \quad (5)$$

where ΔT is equal to the difference between the temperature of the liquid above the point where the side draw stream flowing through conduit means 28 is withdrawn and the temperature of the side draw stream flowing through conduit means 28. The temperature above the point where the side draw stream flowing through conduit means 28 is withdrawn is approximately equal to the temperature of the overhead stream flowing through conduit means 15. Thus, utilizing the nomenclature of FIG. 1, ΔT of Equation (5) is representative of the difference between the temperature represented by signal 42 and the temperature represented by signal 65. In Equation (5) $h_1$ is representative of the heat of vaporization of the side draw stream flowing through conduit means 28 and $C_p$ is representative of the specific heat of the side draw stream flowing through conduit means 28.

All of the elements of Equation (5) are known except for $R_2$ and thus Equation (5) can be solved for the actual flow rate of the internal reflux at the point immediately below the point where the side draw stream flowing through conduit means 28 is withdrawn from the fractional distillation column 11. $R_2$ can then be substituted into Equation (4) and since $V_1$ is known from Equation (2) and $R_1$ is known from Equation (3), Equation (4) may be solved for $V_2$. The ratio of the results of Equations (4) and (5) gives the internal reflux to vapor ratio at the point immediately below the point where the side draw stream flowing through conduit means 28 is withdrawn from the fractional distillation column 11.

Figure 5:
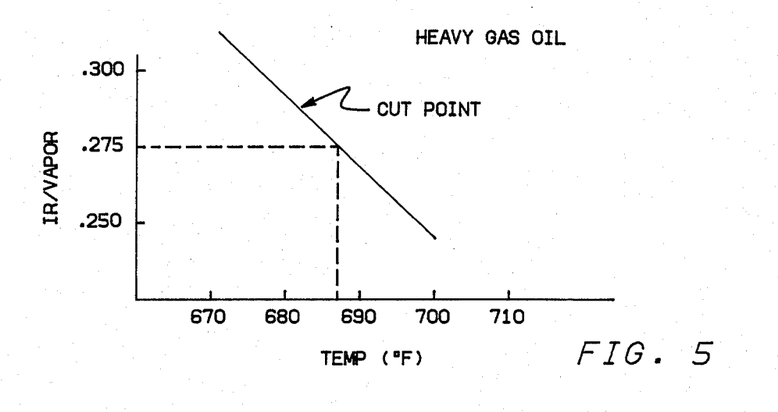
FIG. 5 is a typical plot of the internal reflux to vapor ratio as a function of temperature for the heavy gas oil side draw stream.
Figure 6:
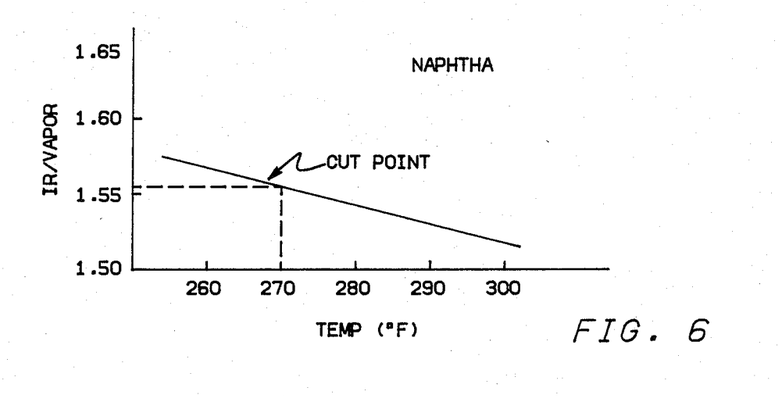
FIG. 6 is a typical plot of the internal reflux to vapor ratio as a function of temperature for the naphtha side draw stream.
Figure 7:
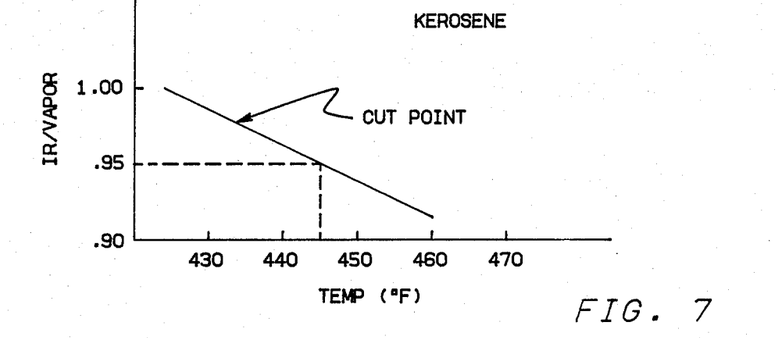
FIG. 7 is a typical plot of the internal reflux to vapor ratio as a function of temperature for the kerosene side draw stream.

FIGS. 5–7 will be utilized to illustrate the manner in which actual 50% cut point temperature can be determined. Referring to FIG. 5, the straight line labeled CUT POINT is derived by actual measurements of the 50% cut point for a heavy gas oil for a known internal reflux to vapor ratio. Once the cut point line is established, the actual internal reflux to vapor ratio, calculated by taking the ratio of Equations (4) and (5), may be used to derive the actual 50% cut point of the heavy gas oil, as illustrated. FIGS. 6 and 7 would be utilized for naphtha and kerosene respectively.

Figure 8:
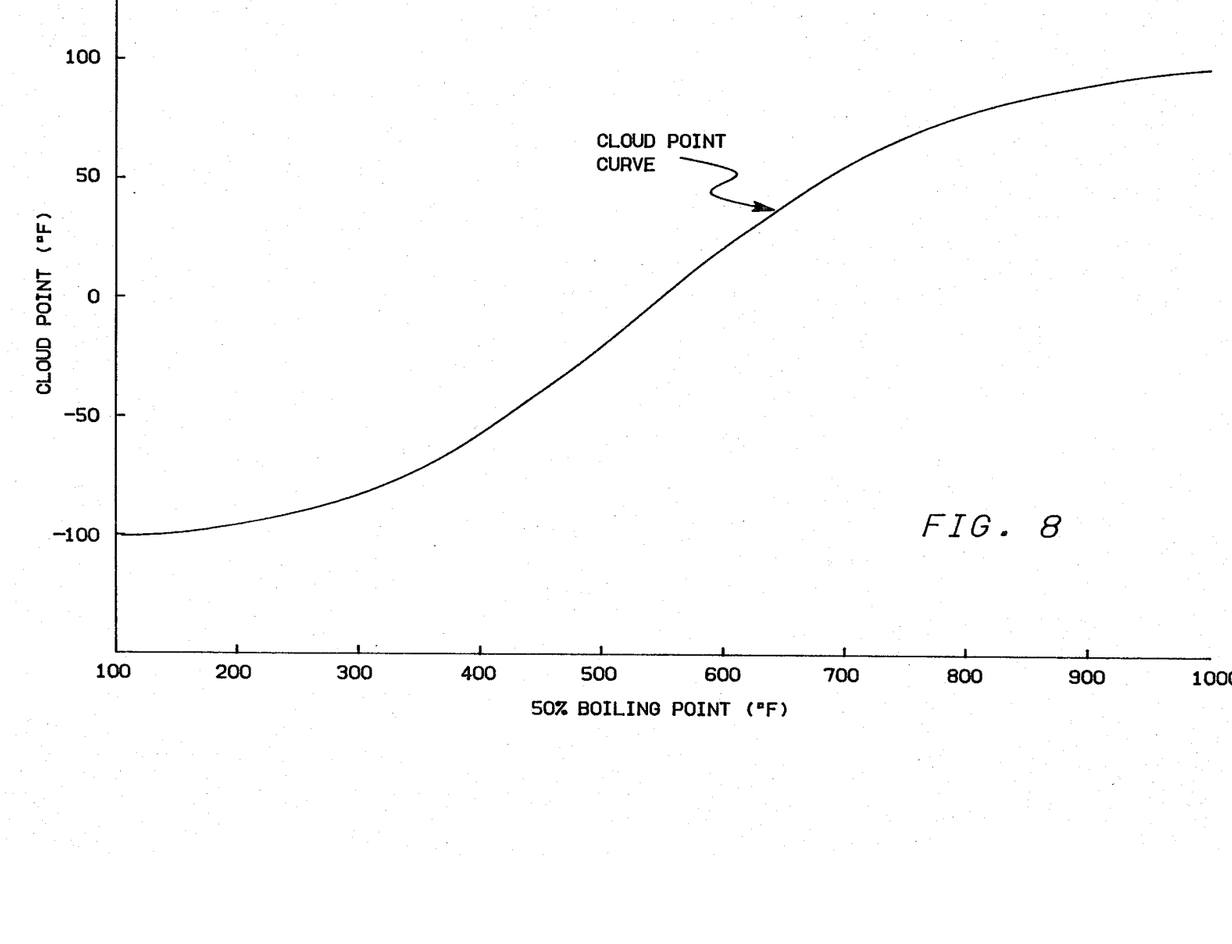
FIG. 8 is a typical plot of cloud point temperature as a function of the 50% cut point for a particular crude oil feedstock.

FIG. 8 will be utilized to illustrate the manner in which the actual cloud point can be determined. Referring to FIG. 8, the cloud point curve is derived by actual measurements of the cloud point of products from a fractional distillation column which have particular 50% cut points. Once the cloud point curve is established, the 50% cut point determined from FIGS. 5–7 may be used to derive the actual cloud point of the particular product.

It is noted that FIG. 8 is valid for a particular crude oil feed. If the composition of the crude oil feed changes substantially, then the curve illustrated in FIG. 8 may also change. However, in general the composition of the crude oil feed to a particular fractional distillation column will not change substantially for long periods of time and thus a particular plot of cloud point versus cut point can be utilized for these long periods of time in which the crude oil composition does not change substantially.

While determination of the actual cloud point has been described in terms of using the actual 50% cut point temperature, it is noted that other cut point temperatures could be utilized or the end point temperature could be utilized if a plot of a particular cut point temperature or the end point temperature versus cloud point is available.

Figure 4:
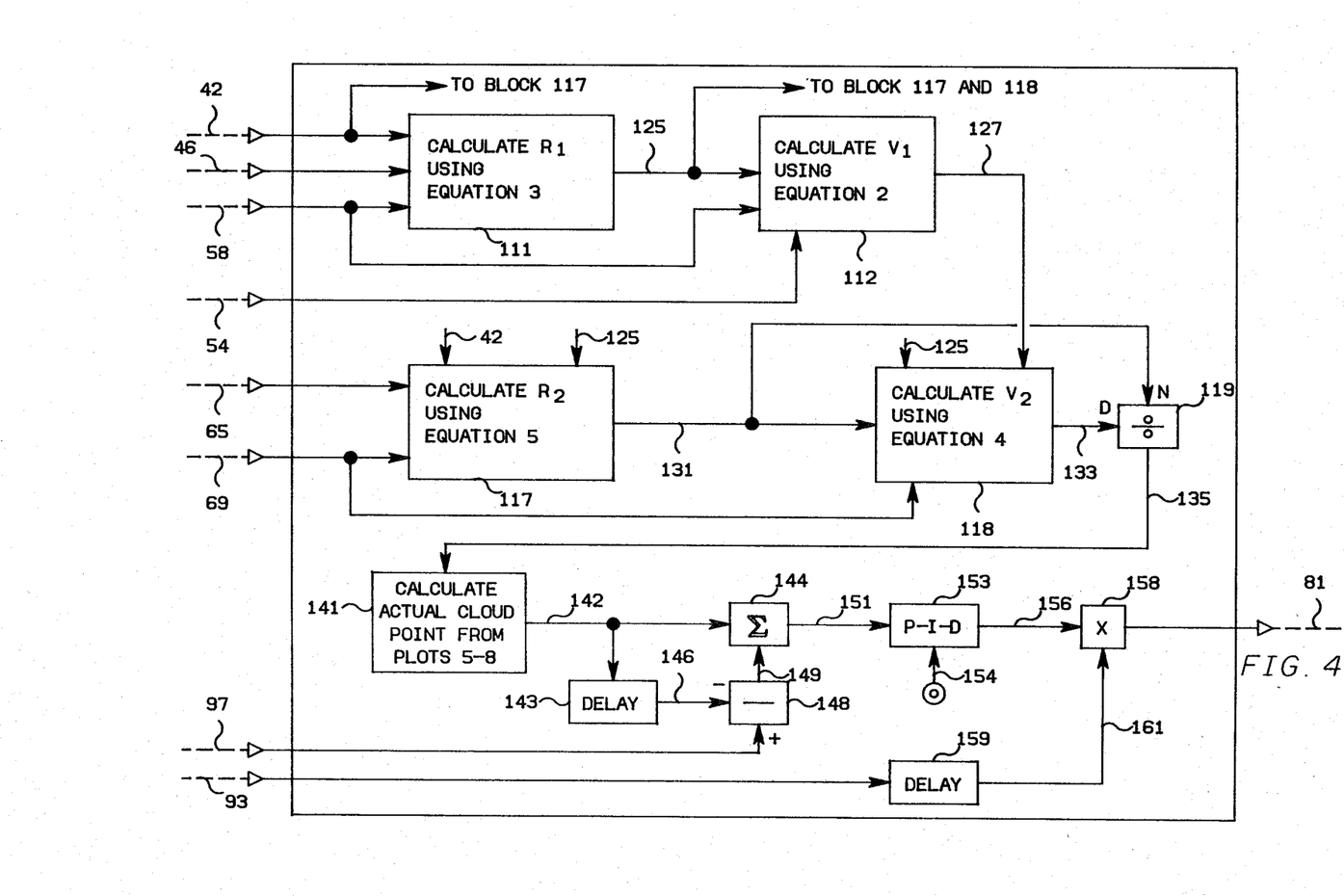
FIG. 4 is a logic diagram for the computer logic utilized to generate the control signals utilized in the control of the fractional distillation column illustrated in FIG. 1.

A simplified flow diagram for the computer logic utilized to calculate the set point signal 81 is illustrated in FIG. 4. Conversion of volume flow rates to mass flow rates is not illustrated but would be utilized for each measured flow rate. Referring to FIG. 4, signal 42, which is representative of the temperature of the overhead stream flowing through conduit means 15, is provided as an input to block 111 and is also provided as an input to block 117. Signal 46, which is representative of the temperature of the external reflux flowing through conduit means 24 is also provided to block 111. Signal 58, which is representative of the flow rate of the external reflux flowing through conduit means 24 is provided as an input to block 111 and is also provided as an input to block 112. In response to the described input signals, the flow rate ($R_1$) of the internal reflux in the upper portion of the fractional distillation column 11 is calculated utilizing Equation (3). Signal 125, which is representative of the flow rate $R_1$, is provided from block 111 as an input to blocks 112, 117 and 118. Block 112 is also provided with signal 54 which is representative of the flow rate of the overhead product stream flowing through conduit means 25. In response to the described inputs, the flow rate ($V_1$) of the vapor at the point immediately below where the upper external reflux flowing through conduit means 24 is returned to the fractional distillation column 11 is calculated utilizing Equation (2). Signal 127, which is representative of $V_1$, is provided from the block 112 as an input to block 118.

Signal 65, which is representative of the temperature of the side draw stream flowing through conduit means 28, is provided as an input to block 117. Signal 69, which is representative of the flow rate of the side draw product stream flowing through conduit means 34, is provided as an input to block 117 and is also provided as an input to block 118. In response to the described inputs, the flow rate ($R_2$) of the internal reflux at the point immediately below the point where the side draw stream flowing through conduit means 28 is withdrawn from the fractional distillation column 11 is calculated. Signal 131, which is representative of $R_2$, is provided from block 117 as an input to block 118 and is also provided to the numerator input of the dividing block 119.

In response to the described inputs, the flow rate ($V_2$) of the vapor at the point immediately below the point where the side draw stream flowing through conduit means 28 is withdrawn from the fractional distillation column 11 is calculated in block 118. Signal 133, which is representative of $V_2$, is provided from block 118 to the denominator input of the dividing block 119. Signal 131 is divided by signal 133 to establish signal 135 which is representative of the actual internal reflux to vapor ratio at the point immediately below the point where the side draw stream flowing through conduit means 28 is withdrawn from the fractional distillation column 11. Signal 135 is provided from the dividing block 119 as an input to 141.

The plots illustrated in FIGS. 5–8 are entered into the computer and are utilized to calculate the actual cloud point based on the actual internal reflux to vapor ratio represented by signal 135. The thus calculated cloud point, which is represented as signal 142, is provided as an input to the delay block 143 and is also provided as an input to the summing block 144. The delay block 143 is utilized to compensate for the time period which passes between the time a sample is taken by the cloud point analyzer and the time the results of the cloud point analyses are available. This time may typically be on the order of one hour and thus signal 142 would be delayed for one hour by the delay block 143 to establish signal 146. Essentially, signal 146 would be representative of the actual cloud point calculated one hour earlier assuming that the delay between taking of a sample and availability of an analysis is one hour. Signal 146 is provided from the delay block 143 to the subtrahend input of the subtracting block 148.

Signal 97, which is representative of the actual cloud point as measured by the cloud point analyzer 95 is provided to the minuend input of the summing block 148. Signal 146 is subtracted from signal 97 to establish signal 149. Signal 149 is provided as an input to the summing block 144. Signal 149 is summed with signal 142 to establish signal 151.

Essentially, signal 149 is utilized to make any correction required in the calculated actual cloud point. It is noted that, if signal 146 and signal 97 are equal, than the magnitude of signal 149 will be zero. Only when the calculated actual cloud point and the measured actual cloud point differ will a correction factor be applied by the use of signal 149.

Signal 151 is provided from the summing block 144 as the process variable input to the controller block 153. The controller block 153 is also provided with a set point signal 154 which is representative of the desired cloud point of the product stream flowing through conduit means 34. In response to signals 151 and 154, the controller block 153 provides an output signal 156 which is responsive to the difference between signals 151 and 154. Signal 156 is scaled so as to be representative of the percentage the crude oil feed stream flowing through conduit means 12 which must be removed as product through conduit means 34 in order to maintain a desired cloud point for the product flowing through conduit means 34. Signal 156 is provided from the controller block 153 as an input to the multiplying block 158.

Signal 93, which is representative of the flow rate of the crude oil feed flowing through conduit means 12 is provided as an input to the delay block 159. The delay block 159 is utilized to compensate for the time required for a change in the flow rate of the crude oil flowing through conduit means 12 to cause a change in the flow rate of the product flowing through conduit means 34. Signal 93 is delayed in the delay block 159 to establish signal 161 which is provided as a second input to the multiplying block 158. Signal 156 is multiplied by signal 161 to establish signal 81 which is representative of the flow rate of the product stream flowing through conduit means 34 required to maintain a desired cloud point for that product stream. Signal 81 is utilized as has been previously described.

It is noted that use of the crude oil feed flow rate provides a means by which changes in the crude oil feed flow rate may be compensated for. Without this compensation, substantial time may pass during which off-specification product is being made because the flow rate of the feed has changed.

The invention has been described in terms of a preferred embodiment as illustrated in FIGS. 1–7. Specific components used in the practice of the invention as illustrated in FIG. 1 such as flow sensors 52, 57, 68 and 92; flow transducers 51, 56, 67 and 91; flow controllers 61 and 71; temperature transducers 41, 44 and 63; and pneumatic control valves 76 and 85 are each well known, commercially available control components such as are described at length in Perry's *Chemical Engineer's Handbook,* 4th Edition, Chapter 22, McGraw-Hill.

While the invention has been described in terms of the presently preferred embodiment, reasonable variations and modifications are possible by those skilled in the art within the scope of the described invention and the appended claims.

That which is claimed is:

1. A method for maintaining a desired cloud point for a side draw product stream which is formed from at least a portion of a side draw stream withdrawn from an intermediate portion of a fractional distillation column, said method comprising the steps of:

using computer means to establish a first signal representative of the actual internal reflux to vapor ratio in said intermediate portion of said fractional distillation column;

using computing means to establish a second signal representative of the calculated actual cloud point of said side draw product stream in response to said first signal;

measuring the cloud point of said side draw product stream and establishing a third signal representative of the measured actual cloud point of said side draw product stream;

utilizing said third signal to correct any error in the cloud point represented by said second signal to thereby establish a fourth signal representative of a corrected actual cloud point of said side draw product stream;

establishing a fifth signal representative of the desired cloud point of said side draw product stream;

using computing means to compare said fourth signal and said fifth signal and establish a sixth signal which is responsive to the difference between said fourth signal and said fifth signal; and controlling the cloud point of said side draw product stream in response to said sixth signal.

2. A method in accordance with claim 1 wherein said step of using computing means to establish said first signal comprises calculating the value of said first signal based on a material balance and energy balance for said intermediate portion of said fractional distillation column.

3. A method in accordance with claim 2 wherein said step of using computing means to establish said second signal comprises calculating the value of said second signal based on a plot of the internal reflux to vapor ratio in said intermediate portion of said fractional distillation column as a function of the cut point or end point temperature of said side draw product stream and based on a plot of the cloud point of said side draw product stream as a function of a cut point or end point of said side draw product stream.

4. A method in accordance with claim 1 wherein said step of using said third signal to estabish said fourth signal comprises:

delaying said second signal for a time period equal to the time period which elapses between sampling of the side draw product stream and availability of the measured cloud point based on said sampling to thereby establish a seventh signal;

subtracting said seventh signal from said third signal to thereby establish an eighth signal; and adding said second signal and said eighth signal to establish said fourth signal.

5. A method in accordance with claim 1 wherein said sixth signal is scaled so as to be representative of the percentage of the feed stream flowing to said fractional distillation column which must be removed as said side draw product stream in order to maintain the actual cloud point of said side draw product stream substantially equal to the desired cloud point and wherein said step of controlling the cloud point of said side draw product stream in response to said sixth signal comprises:

establishing a seventh signal representative of the actual flow rate of said feed stream;

delaying said seventh signal by the time required for a change in the flow rate of said feed stream to cause a change in the flow rate of said side draw product stream to thereby establish an eighth signal;

multiplying said sixth signal and said eighth signal to establish a ninth signal which is representative of the flow rate of said side draw product stream required to maintain the actual cloud point of said side draw product stream substantially equal to the desired cloud point; and manipulating the flow rate of said side draw product stream in response to said ninth signal.

* * * * *